(12) United States Patent
Wu et al.

(10) Patent No.: US 10,963,362 B2
(45) Date of Patent: Mar. 30, 2021

(54) METHOD AND SYSTEM FOR IDENTIFYING LATENCY-SENSITIVE COMPUTING WORKLOADS OF INFORMATION HANDLING SYSTEMS

(71) Applicant: Dell Products L.P., Round Rock, TX (US)

(72) Inventors: Chung Shou Wu, Taipei (TW); Thomas Alexander Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 16/381,896

(22) Filed: Apr. 11, 2019

(65) Prior Publication Data

US 2020/0327032 A1    Oct. 15, 2020

(51) Int. Cl.
| | | |
|---|---|---|
| *G06F 9/46* | (2006.01) | |
| *G06F 11/34* | (2006.01) | |
| *G06F 9/50* | (2006.01) | |
| *H04L 29/08* | (2006.01) | |
| *G06F 1/3203* | (2019.01) | |
| *G06F 1/3234* | (2019.01) | |

(52) U.S. Cl.
CPC .......... *G06F 11/3442* (2013.01); *G06F 9/505* (2013.01); *G06F 11/3485* (2013.01); *G06F 11/3495* (2013.01); *G06F 1/3203* (2013.01); *G06F 1/3234* (2013.01); *H04L 67/10* (2013.01)

(58) Field of Classification Search
CPC .... G06F 13/102; G06F 1/3268; G06F 1/3209; G06F 1/26; G06F 9/4881; G06F 9/5077; G06F 1/3203; G06F 1/3234; G06F 11/3442; G06F 11/3495; G06F 11/3485; G06F 9/505; H04L 7/0331; H04L 67/10; G06Q 30/0207
See application file for complete search history.

(56) References Cited

U.S. PATENT DOCUMENTS

| | | | | |
|---|---|---|---|---|
| 7,188,263 | B1* | 3/2007 | Rubinstein | G06F 1/3209 713/300 |
| 9,467,120 | B1* | 10/2016 | Song | H04L 7/0331 |
| 2004/0128576 | A1* | 7/2004 | Gutman | G06F 1/3209 713/323 |
| 2014/0173306 | A1* | 6/2014 | Cooper | G06F 1/3268 713/320 |

(Continued)

*Primary Examiner* — Tuan A Vu
(74) *Attorney, Agent, or Firm* — Baker Botts L.L.P.

(57) ABSTRACT

Identifying latency-sensitive computing workloads of an information handling system (IHS), including identifying one or more computing parameters of the IHS; monitoring a value of the respective computing parameters; identifying patterns, the patterns indicative of a latency-sensitivity of computing workloads; comparing respective values of the computing parameters with the patterns that are indicative of latency-sensitivity of computing workloads; based on the comparing, calculating a match between a particular pattern and values of respective computing parameters; in response to calculating the match, determining that the workload is latency-sensitive, and disabling a link state power management of the IHS; and after disabling the link state power management of the IHS, performing the computing workload.

19 Claims, 3 Drawing Sheets

(56) References Cited

U.S. PATENT DOCUMENTS

| | | | | |
|---|---|---|---|---|
| 2015/0347189 A1* | 12/2015 | Steffen | ............. | G06F 9/4881 |
| | | | | 718/103 |
| 2017/0139465 A1* | 5/2017 | Badam | ............. | G06F 1/26 |
| 2017/0269675 A1* | 9/2017 | Klacar | ............. | G06F 13/102 |
| 2019/0095231 A1* | 3/2019 | Patel | ............. | G06F 9/5077 |
| 2019/0347125 A1* | 11/2019 | Sankaran | ............. | G06F 9/4881 |
| 2019/0392468 A1* | 12/2019 | Stanciu | ............. | G06Q 30/0207 |

* cited by examiner

METHOD AND SYSTEM FOR IDENTIFYING LATENCY-SENSITIVE COMPUTING WORKLOADS OF INFORMATION HANDLING SYSTEMS

BACKGROUND

Field of the Disclosure

The disclosure relates generally to information handling systems, and in particular, identifying latency-sensitive computing workloads of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system usage models can vary dramatically. Some usage models are largely insensitive to latency across a Peripheral Component Interconnect Express (PCIe) fabric. For example, rendering a 4K video stream depends largely on the number of available CPU cores, their average operating frequency, as well as memory bandwidth. However, some usage models are highly sensitive to the latency of PCIe devices downstream from the chipset. Historically, information handling systems have not, however, pursued the reduction of latency and the variability of latency of downstream devices as there is a balance between performance and average power consumption which must be carefully weighed.

SUMMARY

Innovative aspects of the subject matter described in this specification may be embodied in a computer-implemented method for identifying latency-sensitive computing workloads of information handling systems, the method including identifying a computing workload to be performed at an information handling system (IHS); in response to identifying the computing workload, identifying one or more computing parameters of the IHS; monitoring, at one or more time intervals, a value of the respective computing parameters; identifying one or more patterns, the patterns indicative of a latency-sensitivity of computing workloads; comparing respective values of the computing parameters with the patterns that are indicative of latency-sensitivity of computing workloads; based on the comparing, calculating a match between a particular pattern and one or more values of respective computing parameters; in response to calculating the match, determining that the workload is latency-sensitive, and disabling a link state power management of the IHS; and after disabling the link state power management of the IHS, performing the computing workload.

Other embodiments of these aspects include corresponding system, apparatus, and computer programs, configured to perform the actions of the methods, encoded on computer storage devices.

These and other embodiments may each optionally include one or more of the following features. For instance, the computer parameters of the IHS include one or more of Peripheral Component Interconnect Express (PCIe) link utilization, PCIe link power state, page faults per second, discrete graphics processing unit (GPU) busy state, PCIe storage device state, PCIe storage device temperature, PCIe storage device utilization rate, PCIe storage device read/write percentage, PCIe storage device random access percentage, PCIe storage device average block size, PCIe network device average payload size, and PCIe network device transmit/receive ratio. Comparing respective values of the computing parameters with the patterns that are indicative of latency-sensitivity of computing workloads includes applying a pattern-matching algorithm to the respective values of the computing parameters. Determining a presence of an AC power source of the IHS, and in response, comparing respective values of the computing parameters with the patterns that are indicative of latency-sensitivity of computing workloads. Determine an absence of an AC power source of the IHS, and in response, preventing comparing respective values of the computing parameters with the patterns that are indicative of latency-sensitivity of computing workloads. Calculating a match between a particular pattern and one or more values of respective computing parameters further comprises determining that an average input/output (IO) block size is less than a threshold size, and in response, determining that the workload is latency-sensitive, and disabling the link state power management of the IHS. Comparing the values of respective computing parameters with the patterns that the latency-sensitivity of the computing workload further comprises determining that a page fault rate exceeds a threshold value, and in response, determining that the workload is latency-sensitive, and disabling the link state power management of the IHS. Comparing the values of respective computing parameters with the patterns that the latency-sensitivity of the computing workload further comprises determining that a discrete GPU busy state is active, and in response, determining that the workload is latency-sensitive, and disabling the link state power management of the IHS. Comparing the values of respective computing parameters with the patterns that the latency-sensitivity of the computing workload further comprises determining that network input/output (IO) activity includes a threshold number of payloads less than a threshold size, and in response, determining that the workload is latency-sensitive, and disabling the link state power management of the IHS.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes real-time dynamic identification of workloads which may be sensitive to variable latency in downstream PCI express devices through a heuristic pattern matching algorithm that responds by reducing or eliminating latency introduced in the PCI express fabric at the link level's power management layer. Specifically, this document describes identifying latency-sensitive computing workloads of information handling systems, including identifying a computing workload to be performed at an information handling system (IHS); in response to identifying the computing workload, identifying one or more computing parameters of the IHS; monitoring, at one or more time intervals, a value of the respective computing parameters; identifying one or more patterns, the patterns indicative of a latency-sensitivity of computing workloads; comparing respective values of the computing parameters with the patterns that are indicative of latency-sensitivity of computing workloads; based on the comparing, calculating a match between a particular pattern and one or more values of respective computing parameters; in response to calculating the match, determining that the workload is latency-sensitive, and disabling a link state power management of the IHS; and after disabling the link state power management of the IHS, performing the computing workload.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 1:
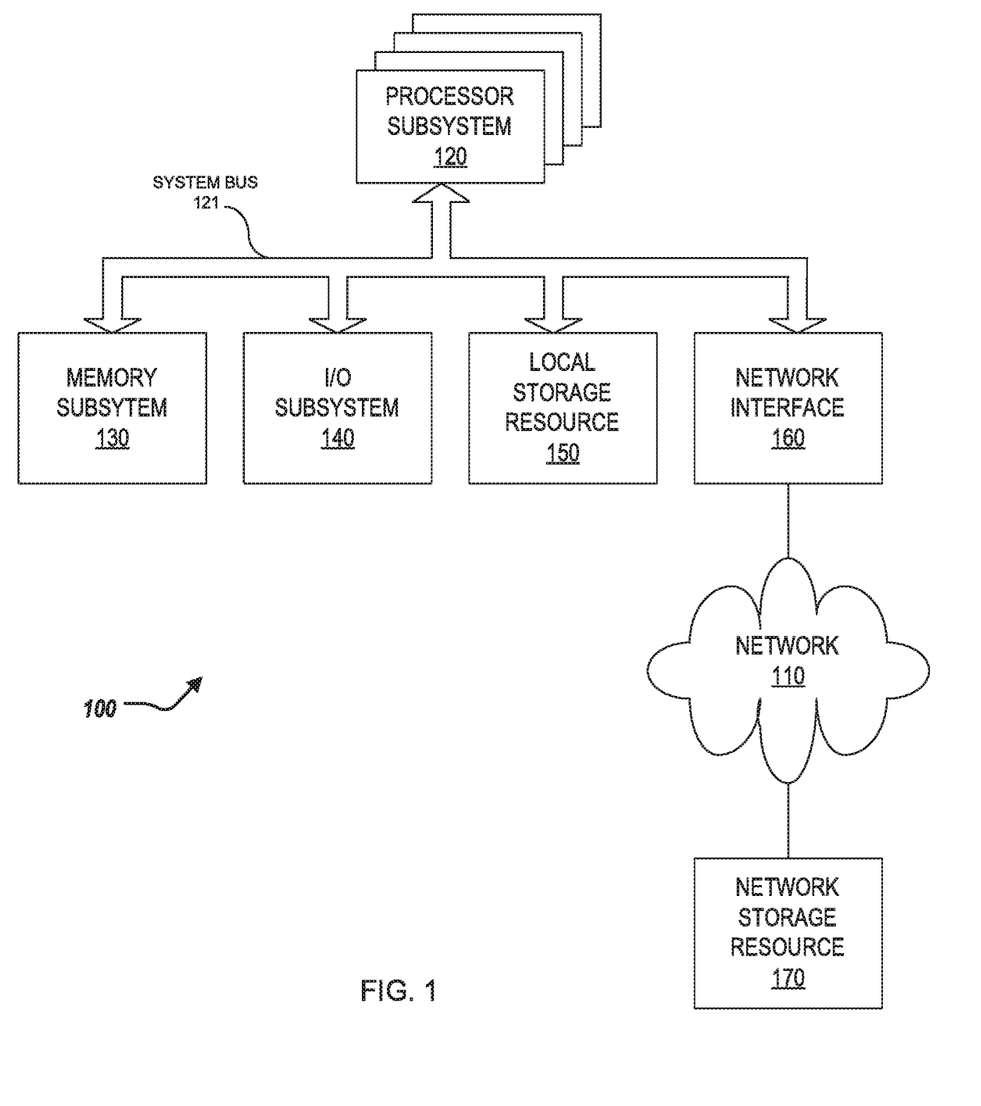
FIG. 1 is a block diagram of selected elements of an embodiment of an information handling system.
Figure 2:
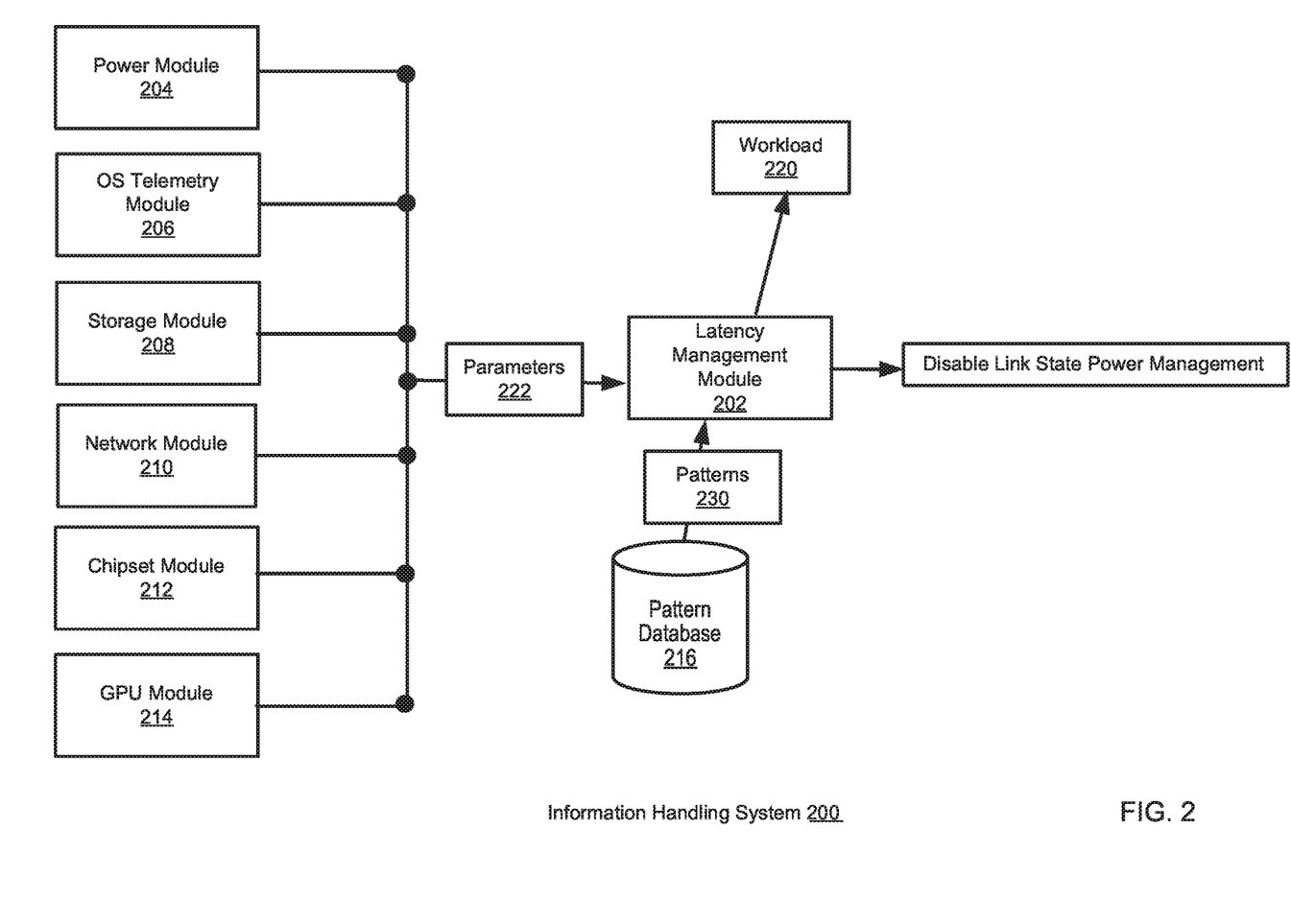
FIG. 2 illustrates an information handling system for identifying latency-sensitive computing workloads.
Figure 3:
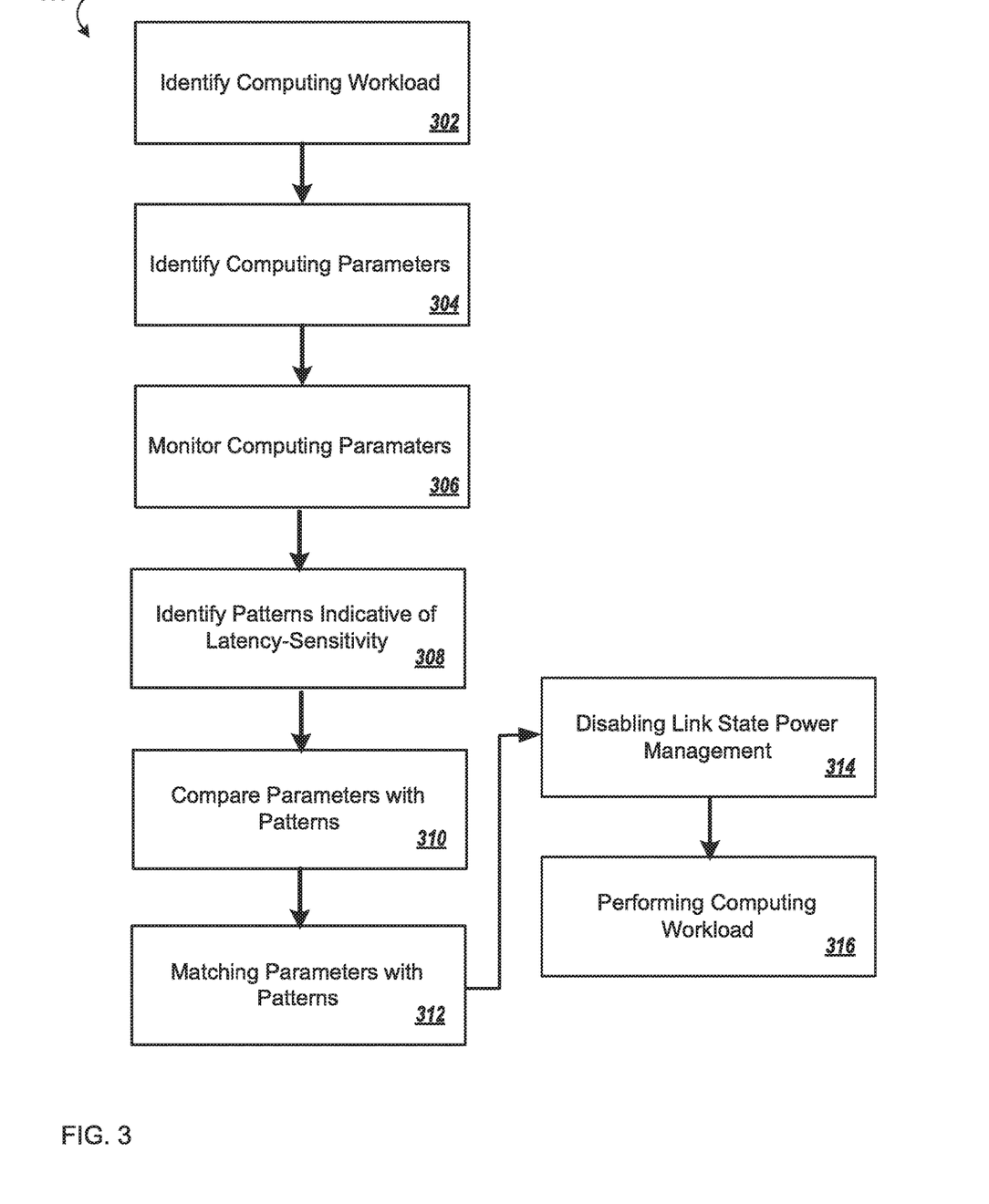
FIG. 3 illustrates a method for identifying latency-sensitive computing workloads of information handling systems.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Turning now to FIG. 2, FIG. 2 illustrates an information handling system (IHS) 200 for identifying latency-sensitive computing workloads of information handling systems. The IHS 200 can include a latency management module 202, a power module 204, an operation system (OS) telemetry module 206, a storage module 208, a network module 210, a chipset module 212, a graphics processing unit (GPU) module 214, and a pattern database 216. The IHS 200 can be similar to the information handling system 100 of FIG. 1. The latency management module 202 can be in communication with the power module 204, the OS telemetry module 206, the storage module 208, the network module 210, the chipset module 212, and the GPU module 214. The latency management module 202 can further be in communication with the pattern database 216.

In short, the IHS 200 can facilitate, when there are performance issues with variable latency in downstream PCIe devices, monitor certain variables of the IHS 200 in real-time using host-based software, and when a particular usage pattern is matched, actions can be taken to improve performance, described further herein. In other words, the IHS 200 determines that applications running on the IHS 200 may encounter a latency-sensitive operation. The IHS 200 then ensures that the interface is not put in a sleep (or hibernation) state for the duration of the operation. For example, high-speed serial links can connect the devices and it can change a power state (on or off) rapidly (e.g., PCIe devices). The IHS 200 can monitor various device parameters to provide as inputs in evaluation of patterns that may indicate latency-sensitivity, described further herein.

The latency management module 202 can identify a computing workload 220 that is to be performed at the IHS 200. The latency management module 202 can, in response to identifying the computing workload 220, identify computing parameters 222 of the IHS 200. In some examples, the power module 204, the OS telemetry module 206, the storage module 208, the network module 210, the chipset module 212, and the GPU module 214 can transmit respective parameters 222 to the latency management module 202. The parameters 222 can be transmitted in response to a request from the latency management module 202; or automatically based a predetermined time-period (e.g., every few seconds or minutes).

The parameters 222 can include various host, chipset, and PCIe link and device parameters based on the components of the IHS 200. In some examples, the parameters 222 can include Peripheral Component Interconnect Express (PCIe) link utilization, PCIe link power state, page faults per second, discrete graphics processing unit (GPU) busy state, PCIe storage device state, PCIe storage device temperature, PCIe storage device utilization rate, PCIe storage device read/write percentage, PCIe storage device random access percentage, PCIe storage device average block size, PCIe network device average payload size, and PCIe network device transmit/receive ratio. However, other parameters are possible depending on the platform and the workload.

In some examples, the latency management module 202 can determine a presence of an AC power source coupled to the IHS 200 to mitigate the risk of increased power consumption when the IHS 200 is utilizing an internal battery, described further herein.

The latency management module 202 can monitor, at one or more time intervals, a value of the respective computing parameters 222. That is, the latency management module 202 can obtain, for each parameter 222, a value of the parameter 222 at multiple points in time (e.g., every 1 second, 10 seconds, 1 minute). The latency management module 202 can store (e.g., temporarily) such values of each parameter 222 as the values are obtained (e.g., received from the power module 204, the OS telemetry module 206, the storage module 208, the network module 210, the chipset module 212, and the GPU module 214). The latency management module 202 can monitor the values of the parameters 222 at multiple points in time to identify patterns that can indicate latency-sensitivity of the workload 220 relative to downstream PCIe devices, described further herein.

The latency management module 202 can receive, from the pattern database 216, one or more patterns 230 (or data indicating such patterns 230). The patterns 230 can be indicative of a latency-sensitivity of computing workloads (e.g., the computing workload 220). For example, the patterns 230 can include, for each parameter 222, a pattern of values of the parameter 222 that would be indicative of a latency-sensitivity of a computing workload. That is, the pattern 230, for a particular parameter 222, can include values over multiple distinct times such that when accumulated, are indicative of a latency-sensitivity of a computing workload. In some examples, a pattern 230 can be based on two or more parameters 222—that is, the pattern 230, can include, for two or more parameters 222, a pattern of values of the two or more parameters 222 that would be indicative of a latency-sensitivity of a computing workload. In some examples, a parameter 222 can be included by two or more patterns 230—that is, for each of the two or patterns 230, the pattern 230 can include the parameter 222 and a pattern of values for the parameter 222 that would be indicative of a latency-sensitivity of a computing workload.

The latency management module 202 can compare respective values of the parameters 222 with the patterns 230 that are indicative of latency-sensitivity of computing workloads. Specifically, the latency management module 202 can identify one or more patterns 230 that are associated with the received parameters 222, and the values of the received parameters 222. The latency management module 202 can compare the values of the parameters 222 with appropriate patterns 230, including comparing values of the parameters 222 with values of the appropriate patterns 230. In some examples, comparing the respective values of the parameters 222 with the patterns 230 includes applying a pattern-matching algorithm to the respective values of the parameters 222.

In some examples, when the latency management module 202 determines a presence of an AC power source coupled to the IHS 200, the latency management module 202 proceeds to compare the respective values of the parameters 222 with the patterns 230. Specifically, in order to mitigate the risk of increased power consumption while utilizing an internal battery (e.g., when the IHS 200 is a mobile computing device), which can negatively impact battery runtime, AC power is monitored such that the latency management module 202 only compares the respective values of the parameters 222 with the patterns 230 when there is AC power present. That is, the latency management module 202 prevents comparing of the respective values of the parameters 222 with the patterns 230 when there is an absence of an AC power source.

The latency management module 202, based on the comparing, can calculate a match between a respective pattern 230 and values of the parameters 222. That is, when values of a particular pattern 230 match (or is substantially similar to) values of the parameters 222, e.g., over a time period, the latency management module 202 determines that there is a match between the pattern 230 and the parameters 222. In some examples, the latency management module 202 calculates the match between the pattern 230 and the values of the parameters 222 based on applying the pattern-matching algorithm to the values of the parameters 222. That is, the pattern-matching algorithm can identify matches between the values of the patterns 230 and the values of the parameters 222 such that it can be determined by the latency management module 202 that the pattern 230 matches the parameters 222.

In some examples, calculating a match between a pattern 230 and the values of the parameters 222 can include determining that an average input/output (IO) block size is less than a threshold size. For example, the threshold size can be 4 kilobytes (KB), and when the average IO block size is less than 4 KB, the latency management module 202 can determine a match of the parameters 222 (average IO block size) and a particular pattern 230 (less than 4 KB). In some examples, the IO block size can additionally include more than a threshold number of random reads.

In some examples, calculating a match between a pattern 230 and the values of the parameters 222 can include determining that a page fault rate exceeds a threshold value. For example, the threshold value can be 10,000 per second. When the page fault rate exceeds 10,000 per second, the latency management module 202 can determine a match of the parameters 222 (page fault rate) and a pattern 230 (greater than 10,000 per second).

In some examples, calculating a match between a pattern 230 and the values of the parameters 222 can include determining that a discrete GPU busy state is active. For example, when the discrete GPU busy state is active, the latency management module 202 can determine a match of the parameters 222 (GPU busy state) and a pattern 230 (active).

In some examples, calculating a match between a pattern 230 and the values of the parameters 222 can include determining that network input/output (IO) activity includes a threshold number of payloads less than a threshold size. For example, the threshold value can be 4 KB. When a threshold number of payloads is less than 4 KB (e.g., a majority), the latency management module 202 can determine a match of the parameters 222 (threshold number of payloads) and a pattern 230 (less than 4 KB).

In some implementations, the latency management module 202, in response to calculating the match, determines that the workload 220 is latency-sensitive. For example, the latency management module 202 can determine that the average IO block size is less than a threshold size, and determine that the workload 220 is latency-sensitive; the latency management module 202 can determine that the page fault rate exceeds a threshold value, and determine that the workload 220 is latency-sensitive; the latency management module 202 can determine that the discrete GPU busy state is active, and determine that the workload 220 is latency-sensitive; and/or the latency management module 202 can determine that the network IO activity includes a threshold number of payloads less than a threshold size, and determine that the workload 220 is latency-sensitive.

In some examples, the latency management module 202, in response to calculating the match, can further disable a link state power management of the IHS 200. Specifically, the latency management module 202 can disable the link state power management to improve average latency and variability of latency of the workload 220. That is, the latency management module 202 can disable a PCIe link power management of the IHS 200, forcing downstream links to run only in L0, or a fully active state. Thus, by eliminating transition periods putting a link into a lower power state and bringing it back to active state to transmit or receive, IO latency is reduced, and the variability of that latency is reduced.

For example, the latency management module 202 can determine that the average IO block size is less than a threshold size, and in response, disable a link state power management of the IHS 200; the latency management module 202 can determine that the page fault rate exceeds a threshold value, and in response, disable a link state power management of the IHS 200; the latency management module 202 can determine that the discrete GPU busy state is active, and in response, disable a link state power management of the IHS 200; and the latency management module 202 can determine that the network IO activity includes a threshold number of payloads less than a threshold size, and in response, disable a link state power management of the IHS 200.

The latency management module 202, after disabling the link state power management of the IHS 200, can facilitate performing of the computing workload 220.

FIG. 3 illustrates a flowchart depicting selected elements of an embodiment of a method 300 for identifying latency-sensitive computing workloads of information handling systems. The method 300 may be performed by the information handling system 100, the IHS 200, and/or the latency management module 202, described herein with reference to FIGS. 1-2, or another information handling system. It is noted that certain operations described in method 300 may be optional or may be rearranged in different embodiments.

The latency management module 202 identifies a computing workload 220 that is to be performed at the IHS 200 (302). The latency management module 202 can, in response to identifying the computing workload 220, identify computing parameters 222 of the IHS 200 (304). The latency management module 202 can monitor, at one or more time intervals, a value of the respective computing parameters 222 (306). The latency management module 202 can identify patterns 230 (308). In some examples, the patterns 230 can be indicative of a latency-sensitivity of computing workloads (e.g., the computing workload 220). The latency management module 202 can compare respective values of the parameters 222 with the patterns 230 that are indicative of latency-sensitivity of computing workloads (310). The latency management module 202, based on the comparing, can calculate a match between a pattern 230 and values of the parameters 222 (312). The latency management module 202, in response to calculating the match, determines that the workload 220 is latency-sensitive and disables a link state power management of the IHS 200 (314). The latency management module 202, after disabling the link state power management of the IHS 200, can facilitate performing of the computing workload 220 (316).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for identifying latency-sensitive computing workloads of information handling systems, the method comprising:
   identifying a computing workload to be performed at an information handling system (IHS);
   in response to identifying the computing workload, identifying one or more computing parameters of the IHS, the computing parameters including payloads of network input/output (IO) activity;
   monitoring, at one or more time intervals, a value of the respective computing parameters;
   identifying one or more patterns, the patterns indicative of a latency-sensitivity of computing workloads;
   comparing respective values of the computing parameters with the patterns that are indicative of latency-sensitivity of computing workloads, including comparing a size of the payloads of the network IO activity with a threshold size;
   based on the comparing, calculating a match between a particular pattern and one or more values of respective computing parameters, including determining that a majority of the payloads of the network IO activity are less than the threshold size;

in response to calculating the match, determining that the workload is latency-sensitive, and disabling a link state power management of the IHS; and after disabling the link state power management of the IHS, performing the computing workload.

2. The computer-implemented method of claim 1, wherein the computer parameters of the IHS include one or more of Peripheral Component Interconnect Express (PCIe) link utilization, PCIe link power state, page faults per second, discrete graphics processing unit (GPU) busy state, PCIe storage device state, PCIe storage device temperature, PCIe storage device utilization rate, PCIe storage device read/write percentage, PCIe storage device random access percentage, PCIe storage device average block size, PCIe network device average payload size, and PCIe network device transmit/receive ratio.

3. The computer-implemented method of claim 1, wherein comparing respective values of the computing parameters with the patterns that are indicative of latency-sensitivity of computing workloads includes applying a pattern-matching algorithm to the respective values of the computing parameters.

4. The computer-implemented method of claim 1, further comprising determining a presence of an AC power source of the IHS, and in response, comparing respective values of the computing parameters with the patterns that are indicative of latency-sensitivity of computing workloads.

5. The computer-implemented method of claim 1, further comprising determining an absence of an AC power source of the IHS, and in response, preventing comparing respective values of the computing parameters with the patterns that are indicative of latency-sensitivity of computing workloads.

6. The computer-implemented method of claim 1, wherein calculating a match between a particular pattern and one or more values of respective computing parameters further comprises determining that an average input/output (IO) block size is less than a threshold size, and in response, determining that the workload is latency-sensitive, and disabling the link state power management of the IHS.

7. The computer-implemented method of claim 1, wherein comparing the values of respective computing parameters with the patterns that the latency-sensitivity of the computing workload further comprises determining that a page fault rate exceeds a threshold value, and in response, determining that the workload is latency-sensitive, and disabling the link state power management of the IHS.

8. The computer-implemented method of claim 1, wherein comparing the values of respective computing parameters with the patterns that the latency-sensitivity of the computing workload further comprises determining that a discrete GPU busy state is active, and in response, determining that the workload is latency-sensitive, and disabling the link state power management of the IHS.

9. A system comprising a processor having access to memory media storing operations executable by the processor to:

identifying a computing workload to be performed at an information handling system (IHS);

in response to identifying the computing workload, identifying one or more computing parameters of the IHS, the computing parameters including payloads of network input/output (IO) activity;

monitoring, at one or more time intervals, a value of the respective computing parameters;

identifying one or more patterns, the patterns indicative of a latency-sensitivity of computing workloads;

comparing respective values of the computing parameters with the patterns that are indicative of latency-sensitivity of computing workloads, including comparing a size of the payloads of the network IO activity with a threshold size;

based on the comparing, calculating a match between a particular pattern and one or more values of respective computing parameters, including determining that a majority of the payloads of the network IO activity are less than the threshold size;

in response to calculating the match, determining that the workload is latency-sensitive, and disabling a link state power management of the IHS; and after disabling the link state power management of the IHS, performing the computing workload.

10. The system of claim 9, wherein the computer parameters of the IHS include one or more of Peripheral Component Interconnect Express (PCIe) link utilization, PCIe link power state, page faults per second, discrete graphics processing unit (GPU) busy state, PCIe storage device state, PCIe storage device temperature, PCIe storage device utilization rate, PCIe storage device read/write percentage, PCIe storage device random access percentage, PCIe storage device average block size, PCIe network device average payload size, and PCIe network device transmit/receive ratio.

11. The system of claim 9, wherein comparing respective values of the computing parameters with the patterns that are indicative of latency-sensitivity of computing workloads includes applying a pattern-matching algorithm to the respective values of the computing parameters.

12. The system of claim 9, the operations further comprising determining a presence of an AC power source of the IHS, and in response, comparing respective values of the computing parameters with the patterns that are indicative of latency-sensitivity of computing workloads.

13. The system of claim 9, the operations further comprising determining an absence of an AC power source of the IHS, and in response, preventing comparing respective values of the computing parameters with the patterns that are indicative of latency-sensitivity of computing workloads.

14. The system of claim 9, wherein calculating a match between a particular pattern and one or more values of respective computing parameters further comprises determining that an average input/output (IO) block size is less than a threshold size, and in response, determining that the workload is latency-sensitive, and disabling the link state power management of the IHS.

15. The system of claim 9, wherein comparing the values of respective computing parameters with the patterns that the latency-sensitivity of the computing workload further comprises determining that a page fault rate exceeds a threshold value, and in response, determining that the workload is latency-sensitive, and disabling the link state power management of the IHS.

16. The system of claim 9, wherein comparing the values of respective computing parameters with the patterns that the latency-sensitivity of the computing workload further comprises determining that a discrete GPU busy state is active, and in response, determining that the workload is latency-sensitive, and disabling the link state power management of the IHS.

17. The system of claim 9, wherein comparing the values of respective computing parameters with the patterns that the latency-sensitivity of the computing workload further comprises determining that network input/output (IO) activity includes a threshold number of payloads less than a threshold size, and in response, determining that the workload is latency-sensitive, and disabling the link state power management of the IHS.

18. A non-transitory computer-readable medium storing software comprising instructions executable by one or more computers which, upon such execution, cause the one or more computers to perform operations comprising:

identifying a computing workload to be performed at an information handling system (IHS);

in response to identifying the computing workload, identifying one or more computing parameters of the IHS, the computing parameters including payloads of network input/output (IO) activity;

monitoring, at one or more time intervals, a value of the respective computing parameters;

identifying one or more patterns, the patterns indicative of a latency-sensitivity of computing workloads;

comparing respective values of the computing parameters with the patterns that are indicative of latency-sensitivity of computing workloads, including comparing a size of the payloads of the network IO activity with a threshold size;

based on the comparing, calculating a match between a particular pattern and one or more values of respective computing parameters, including determining that a majority of the payloads of the network IO activity are less than the threshold size;

in response to calculating the match, determining that the workload is latency-sensitive, and disabling a link state power management of the IHS; and after disabling the link state power management of the IHS, performing the computing workload.

19. The computer-readable medium of claim 18, wherein the computer parameters of the IHS include one or more of Peripheral Component Interconnect Express (PCIe) link utilization, PCIe link power state, page faults per second, discrete graphics processing unit (GPU) busy state, PCIe storage device state, PCIe storage device temperature, PCIe storage device utilization rate, PCIe storage device read/write percentage, PCIe storage device random access percentage, PCIe storage device average block size, PCIe network device average payload size, and PCIe network device transmit/receive ratio.

* * * * *